United States Patent
Wallis et al.

(10) Patent No.: US 10,074,155 B2
(45) Date of Patent: Sep. 11, 2018

(54) DYNAMIC SELECTION OF IMAGE RENDERING FORMATS

(71) Applicant: Apple Inc., Cupertino, CA (US)

(72) Inventors: Luke S. Wallis, San Francisco, CA (US); Ian C. Hendry, San Jose, CA (US); Hans Werner Neubrand, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 15/179,779

(22) Filed: Jun. 10, 2016

(65) Prior Publication Data
US 2017/0358050 A1    Dec. 14, 2017

(51) Int. Cl.
| | | |
|---|---|---|
| G06T 1/20 | (2006.01) | |
| G06T 1/60 | (2006.01) | |
| G06T 15/00 | (2011.01) | |

(52) U.S. Cl.
CPC ............ *G06T 1/60* (2013.01); *G06T 15/00* (2013.01); *G06T 2210/08* (2013.01); *G06T 2210/32* (2013.01)

(58) Field of Classification Search
CPC .. G06T 1/20; G06T 1/60; G06T 15/00; G06T 2210/08; G06T 2210/32
USPC ........................................................ 345/522
See application file for complete search history.

(56) References Cited

U.S. PATENT DOCUMENTS

| | | | |
|---|---|---|---|
| 7,106,336 B1 * | 9/2006 | Hutchins | G06T 11/40 345/427 |
| 7,948,896 B2 * | 5/2011 | Andersen | H04L 47/522 370/235.1 |
| 8,531,493 B2 * | 9/2013 | Hui | G09G 3/2022 345/108 |
| 8,564,620 B2 | 10/2013 | Bellamy | |
| 9,230,295 B2 | 1/2016 | Keslin | |
| 2002/0032744 A1 * | 3/2002 | Magoshi | A63F 13/10 709/217 |
| 2005/0152612 A1 * | 7/2005 | Spaulding | H04N 1/603 382/254 |
| 2014/0327688 A1 * | 11/2014 | Lassen | G06T 1/60 345/552 |
| 2015/0093023 A1 * | 4/2015 | Greenebaum | G06T 9/00 382/166 |
| 2015/0281299 A1 | 10/2015 | Moustafa | |

FOREIGN PATENT DOCUMENTS

WO    2011028177 A1    3/2011

* cited by examiner

*Primary Examiner* — Ke Xiao
*Assistant Examiner* — Kim-Thanh T Tran
(74) *Attorney, Agent, or Firm* — Blank Rome LLP

(57) ABSTRACT

Systems, methods, and computer readable media to promote a graphics context when rendering a digital image content with dynamic ranges and/or color gamut outside the current graphics context. Various embodiments render digital image content based on a graphics context that corresponds to an initial image rendering format. During the rendering process a determination is made that indicates the quality of the digital image content exceeds the graphics context's initial capabilities. The various embodiments can select an updated image rendering format based on the quality of the digital image and expand the graphic context's capabilities to correspond with the updated image rendering format.

20 Claims, 4 Drawing Sheets

DYNAMIC SELECTION OF IMAGE RENDERING FORMATS

BACKGROUND

This disclosure relates generally to graphics rendering. More particularly, but not by way of limitation, this disclosure relates to dynamically selecting image rendering formats for one or more digital images.

Graphics processing units (GPUs) have become important for processing data-parallel graphics tasks. Developers have also recognize that GPUs are able to handle non-graphics data-parallel tasks that may benefit from the GPUs' massive parallel capabilities. To accommodate high level developer programming interactions with the GPUs, vendors and standards organizations have created application programming interfaces (APIs) that simplify implementing graphics data-parallel tasks. Venders and standards organizations also generally employ low-level APIs, libraries, and/or frameworks that reside closer to graphics processing resources (e.g., the GPU) and apply the output for higher-level APIs. In particular, the higher-level APIs generally prepare program code that call and apply the lower-level APIs, libraries, and/or frameworks to utilize the GPUs.

When a computing application launches and attempts to render digital images, APIs and/or frameworks may initially allocate graphics hardware resources, such as memory buffers and GPUs, during a rendering initialization phase. In order to reduce computational cost and increase operation efficiency, APIs and/or frameworks may commit a pre-determined amount of graphics hardware resources to render the digitals images. For example, APIs and/or frameworks generally allocate memory resources to store graphics contexts that render standard red-blue-green (sRGB) images. However, initially limiting the memory capacity for storing graphics contexts creates an inability to draw higher quality digital images, such as high dynamic range (HDR) images. For instance, after an API and/or framework commits memory resources for rendering sRGB images, the API and/or framework may be unable to render a subsequent HDR image that exceeds the capacity of the graphics contexts.

One alternative is for APIs and/or frameworks to employ a worst case scenario approach when allocating memory and other graphics hardware resources. Specifically, during the rendering initialization phase, APIs and/or frameworks may initially allocate enough memory space to store graphics contexts for not only sRGB images, but higher quality images with greater dynamic ranges in luminosity and/or a wider color gamut. Unfortunately, over allocating graphics hardware resources is often computationally expensive, increases power consumption, and decreases overall operation efficiency. For example, APIs and/or frameworks may squander graphics processing resources when rendering a relatively low quality digital image, such as a black and white text image (e.g., the word "fox"), with graphics contexts set up to draw relatively higher quality images (e.g., HDR images). As such, creating APIs and/or frameworks that adaptively account for varying digital image qualities may be beneficial for the graphics rendering process.

SUMMARY

In one embodiment, the disclosed subject matter provides a method to promote a graphics context when rendering a digital image content with dynamic ranges and/or color gamut outside the current graphics context's capabilities. The method includes rendering digital image content based on a graphics context having an associated initial image rendering format and initial capabilities and determining whether a quality of the digital image content exceeds at least one of the initial capabilities. Based on the quality of the digital image, the method selects an updated image rendering format based on the determination that the quality of the digital image content exceeds the at least one initial capabilities and expands the graphics context's initial capabilities to a graphics context's current capabilities that corresponds with the updated image rendering format. Afterwards, the method continues with rendering the digital image content based on the graphics context's current capabilities.

In another embodiment, the method dynamically selects graphics context for digital image content. Rather than allocating a pre-determined memory size that corresponds to a specific image rendering format, the method receives rendering commands for one or more digitals and stores properties of the digital images without rendering the digital images. The method may cache a series of graphics commands associated with one or more digital images and continue to cache graphics command until reaching a rendering triggering event occurs. At that point, the method may parse the cached content and dynamically select an image rendering format based on the digital image content's quality and allocate memory resources for the graphic contexts based on the selection of the image rendering format.

In yet another embodiment, the method dynamically selects graphics context for digital image content. This approach involves receiving image information for rendering digital image content from a computing application. The method then documents the image information without allocating memory resources for the graphics contexts while determining whether a rendering trigger event occurs. If a trigger event occurs, the method selects one or more image rendering formats for the documented digital image and allocates memory space for the graphics contexts based on the selected image rendering formats. The rendering process continues using the selected image rendering formats. If the method receives additional digital image content received after the rendering trigger event, the method may promote the graphics contexts when the additional digital image context exceeds the graphics contexts' capabilities.

In one or more embodiments, each of the above described methods, and variation thereof, may be implemented as a series of computer executable instructions. Such instructions may use any one or more convenient programming language. Such instructions may be collected into modules and/or programs and stored in any media that is readable and executable by a computer system, apparatus, or other programmable control device.

DETAILED DESCRIPTION

Figure 1:
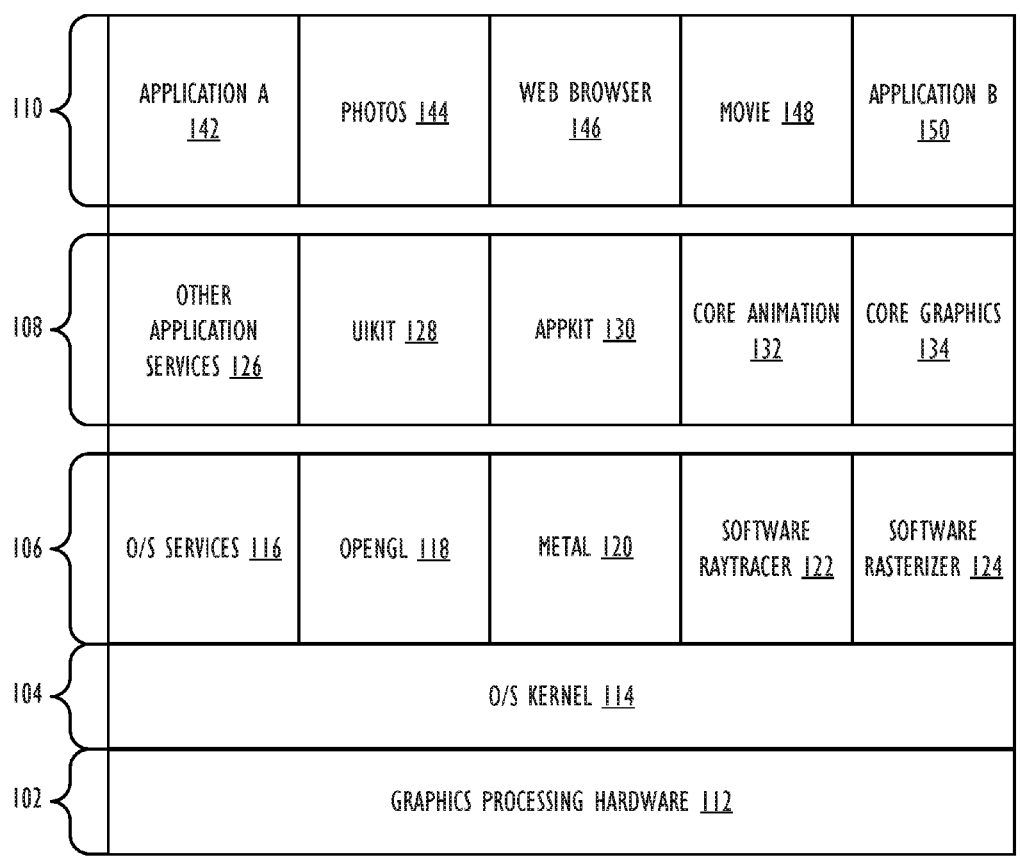
FIG. 1 is a block diagram of a graphics software architecture wherein embodiments of the present disclosure may operate.

This disclosure includes various example embodiments that dynamically promote a graphics context when rendering a digital image content with dynamic ranges and/or color gamut outside the current graphics context. Rather than allocating a pre-determined memory size that corresponds to a specific image rendering format (e.g., sRGB image format or 16 bit per color channel RGB image format) during the rendering initialization phase, an API and/or framework may move memory allocation for a graphics context to a later point in time. Instead of rendering digital images each time an API and/or framework receives a rendering command (e.g., a draw call), the API and/or framework may store properties of the digital images without rendering the digital images. In one embodiment, the API and/or framework may cache a series of graphics commands (e.g., using a graphics display list) associated with one or more digital images. The cached series of graphics commands may continue to update until a rendering triggering event occurs (e.g., computing application determines that it has received all digital images from a user). At that point, the API and/or framework may parse the cached content and dynamically select an image rendering format based on the digital image content's quality.

Additionally or alternatively, after the API and/or framework selects an initial rendering format to draw digital image content, the API and/or framework may subsequently promote the graphics context if the quality of the digital image context exceeds the graphics context's capabilities. During the image rendering process, the API and/or framework checks for a variety of rendering parameters, such as imaging profiles, dynamic ranges, and rendered colors, associated with the digital image content. If the rendering parameters exceed the current graphics context's capabilities, then the API and/or framework promotes the graphics context to correspond to an updated image rendering format that is able to render the digital image content. The API and/or framework subsequently continues the rendering processes with the updated image rendering format.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of detecting motion having the benefit of this disclosure.

FIG. 1 is a block diagram of a graphics software architecture 100 wherein embodiments of the present disclosure may operate. In FIG. 1, the graphics software architecture 100 employs a notation that is generally intended to imply that software elements shown in a higher layer use resources from the lower layers and provide services to layers above. For example, the operating system (O/S) kernel layer 104 may use resources from the hardware layer 102. However, persons of ordinary skill in the art are aware that in practice, all components of a particular software element may not behave entirely in that manner. The graphics software architecture 100 discussed here is not intended to be exclusive in any way, but rather to be illustrative and facilitate ease of description and explanation. This is especially true for layer-type diagrams, which persons of ordinary skill in the art (e.g., software developers) tend to express in somewhat differing ways.

FIG. 1 illustrates that at the bottom of the graphics software architecture 100 is a hardware layer 102 that includes graphics processing hardware 112. The graphics processing hardware 112 may include CPUs, GPUs, memory, display controllers, and/or other processing and computer hardware for rendering and displaying digital image content. Above the hardware layer 102 is the O/S kernel layer 104, where FIG. 1 shows an O/S kernel 114 as an example of the O/S kernel layer 104. The O/S kernel 114 may be kernel software that may manage and control access to the hardware layer 102. The O/S kernel 114 may perform operations that include but are not limited to memory management, device management, and system calls that are often in the purview of hardware drivers.

FIG. 1 illustrates that on top of the O/S kernel layer 104 is the O/S service layer 106, which may be exemplified by O/S services 116. O/S services 116 may provide core O/S functions in a protected environment. In addition, O/S services 116 may include frameworks for OPENGL 118 (OPENGL is a registered trademark of the Silicon Graphics, Inc.), Metal 120 (developed by Apple Inc.), Software Raytracer 122, and a Pure Software Rasterizer 124. These particular examples all relate to graphics and/or graphics libraries and are chosen to illuminate the topic of many embodiments herein, which relate to graphics handling. The examples also represent graphics frameworks/libraries that may operate in the lower tier of frameworks such that developers may use shading and graphics primitives and/or obtain fairly tightly coupled control over the graphics hardware. In addition, the particular examples named in the O/S service layer 106 may pass their work product on directly to hardware or hardware drivers, which is software typically tightly coupled to the hardware.

In particular, OPENGL 118 represents an example of a well-known library and API for graphics rendering including two dimensional (2D) and three dimensional (3D) graphics. Metal 120 also represents a published graphics library and framework, but may be a lower level than OPENGL 118 that supports fine-grained, low-level control of the organization, processing, and submission of graphics and computation commands, as well as the management of associated data and resources for those commands. Software Raytracer 122 is software for creating image information based upon the process of tracing the path of light through pixels in the plane of an image. Pure Software Rasterizer 124 refers generally to software used to make graphics information such as pixels without specialized graphics hardware (e.g., using only the CPU). These libraries or frameworks shown within the O/S services layer 106 are only exemplary and intended to show the general level of the layer and how it relates to other software in a sample arrangement (e.g., kernel operations usually below and higher-level applications services 126 usually above). In addition, it may be useful to note that Metal 120 represents a published framework/library of Apple Inc. that is known to developers in the art. Furthermore, OPENGL 118 may represent a framework/library present in current versions of software distributed by Apple Inc.

Above the O/S services layer 106 is an application services layer 108, which includes UIKit 128, AppKit 130, Core Animation 132, and Core Graphics 134 that exemplify application services. The O/S services layer 106 represents higher-level frameworks that are commonly directly accessed by application programs. In some embodiments of this disclosure, the application services layer 108 may include graphics-related frameworks that are high level in that they are agnostic to the underlying graphics libraries, such as those discussed with respect to O/S services layer 106. In such embodiments, the higher-level graphics frameworks are meant to provide developer access to graphics functionality in a more user/developer-friendly way and to allow developers to avoid work with shading and graphics primitives. By way of example, UIKit 128 is a framework to construct and manage iOS applications made available by Apple Inc. UIKit 128 may manage an application's user interface and the event handling infrastructure for responding to user input. App Kit 130 is a framework containing objects developers may use to implement graphical, event-driven user interface, such as windows, panels, buttons, menus, scrollers, and text fields. Core Animation 132 is a graphics rendering and animation infrastructure made available from Apple Inc. Core Animation 132 may be used to animate views and other visual elements of an application. Core Graphics 134 is a two-dimensional drawing engine from Apple Inc. that provides 2D rendering for applications.

Above the application services layer 108 is the application layer 110 that includes one or more computing applications. FIG. 1 illustrates three specific examples of computing applications: photos application 144 (a photo management, editing, and sharing program), web browser application 146 (a browser to retrieve information resources from the World Wide Web), and movie application 148 (a movie making and sharing program). As shown in FIG. 1, the application layer 110 also shows two generic computing applications, application A 142 and application B 150, which represent the presence of any other computing applications that may interact with or be part of the inventive embodiments disclosed herein. Generally, embodiments of the invention employ and/or interact with computing applications that produce displayable/viewable content.

In evaluating O/S services layer 106 and applications services layer 108, it may be useful to realize that different frameworks have higher-level or lower-level application program interfaces, even if the frameworks are represented in the same layer of FIG. 1. The illustration of FIG. 1 serves to provide a general guideline and to introduce exemplary frameworks that may be discussed later. Furthermore, some embodiments of the invention may imply that frameworks in applications services layer 108 make use of the libraries represented in the O/S services layer 106. Thus, FIG. 1 provides intellectual reinforcement for these examples. Importantly, FIG. 1 is not intended to limit the types of frameworks or libraries that may be used in any particular way or in any particular embodiment. Generally, many embodiments of this disclosure propose software activity and architecture in the layers between hardware layer 102 and application layer 110, shown by layer 152.

With reference again to FIG. 1, some embodiments may suggest the using higher-level frameworks, such as those shown in application services layer 108. The high-level frameworks may perform intelligent analysis on particular graphics requests from application programs. The high level framework may then choose a specific hardware and/or a specific library or low-level framework to help process the request. In these embodiments, the intelligent analysis may provide for on-the-fly decision making regarding the best path for the graphics request to follow down to hardware.

In one embodiment, an application service, such as UIKit 128 or AppKit 130, and/or another higher-level application service 126 in the application services layer 108, may adaptively select and/or promote the graphics context to an appropriate rendering format. In some instances, computing applications in the application layer 110 may not directly allocate memory space (e.g., frame buffers) for the graphics context and/or may be unable to determine the digital image content the computing application will render at the time of memory allocation. For example, some of the digital image content the computing application may render may depend on a user's actions, such as user-downloaded images, user-selected images, and/or user-selected colors that occur after the rendering initialization phase.

To accommodate digital image content with image quality attributes that vary in range, the application service may initially document rendering commands for the digital image content without rendering the digital image content. In particular, the application service may document rendering commands by caching and/or copying the rendering commands into a specified memory location. In one embodiment, the application service may document rendering commands using a graphics display list. The application service may continue to document rendering commands (e.g., update the display list) until a rendering trigger event occurs. A rendering trigger event may be set to occur depending on a programmer's preference, the application service's settings, and/or available graphics processing resources to a computing system. Non-limiting examples of possible rendering trigger event include when: the computing application services receives all of the digital image content from an user, the memory size to cache rendering commands reaches a predetermined threshold, the application service receives a specific rendering instruction (e.g., set a color and/or draw a color), the application services determines that a received rendering operation is larger than a previously stored rendering operation, a developer and/or user attempts to access the memory buffer that stores the graphics context, or combinations thereof. Once the application services determines the occurrence of a rendering trigger event, the application service may select an image rendering format for the digital image content and allocate the appropriate graphics hardware resources, such as memory size to store the graphics contexts, to render the digital images using the selected image rendering format.

After the application service commits graphics processing resources to render previous digital image content (e.g., after a rendering trigger event), the application service may check rendering parameters (e.g., image profiles and rendered colors) indicative of one or more image quality attributes and determine whether current and/or known digital image content exceeds current graphics context's capabilities. As an example, when a developer builds a computing application, a graphics context may be associated with a basic display window rendering that includes a text field. When a user launches the computing application, a user may input text, such as the word "fox," into a text field. The applicant service may decide to render the input text by selecting an image rendering format (e.g., sRGB bitmap) and allocating memory resources for the graphics context corresponding to the selected image rendering format. Afterwards, additional text (e.g., "quick"), selected colors, and other digital images (e.g., emoji) may be rendered on top of the text image "fox" within the text field, where the application service may harvest the same graphics context to render the additional digital image content. If the one or more image quality attributes of the additional digital image content (e.g., an HDR digital image) exceeds one or more of the current graphics context's capabilities then the application service promotes the graphics context to handle a more appropriate rendering format (e.g., a 10 bit per color channel RGB bitmap). The rendering process then continues using the updated rendering format.

Although the FIG. 1 generally references that an application services may perform the selection and promotion operation, persons of ordinary skill in the art would be aware that this disclosure is not limited to higher level frameworks. For instance, other embodiments may use one or more lower level APIs and/or frameworks found in the O/S services layer 106 to adaptively select and/or promote the graphics context to an appropriate rendering format. Moreover, the selection and/or promotion of the graphics context to an appropriate rendering format may be implemented by layer 152 that includes functions across multiple layers of the graphics software architecture 100 shown in FIG. 1.

Figure 2:
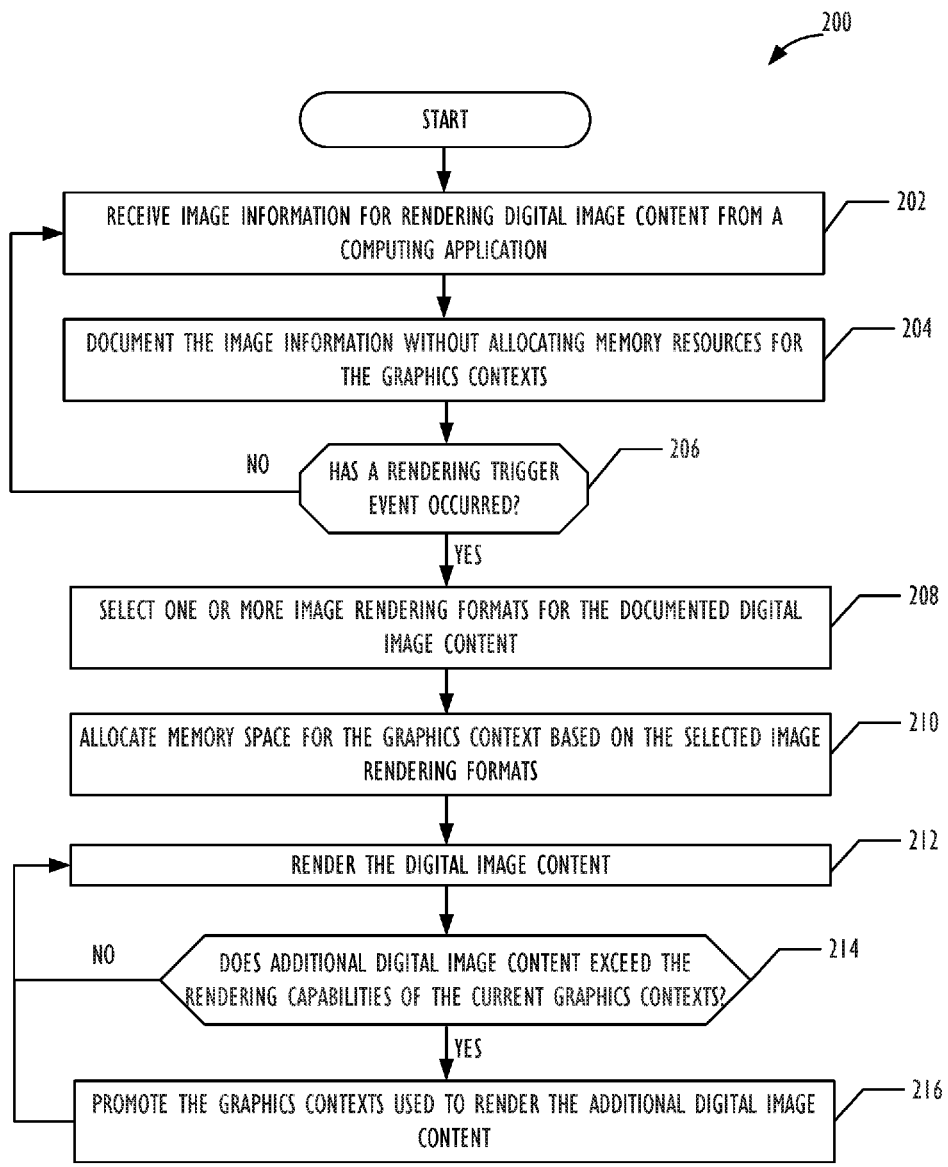
FIG. 2 illustrates a graphics context promotion operation that dynamically selects image rendering formats by documenting image information used to render the digital image content.
Figure 3:
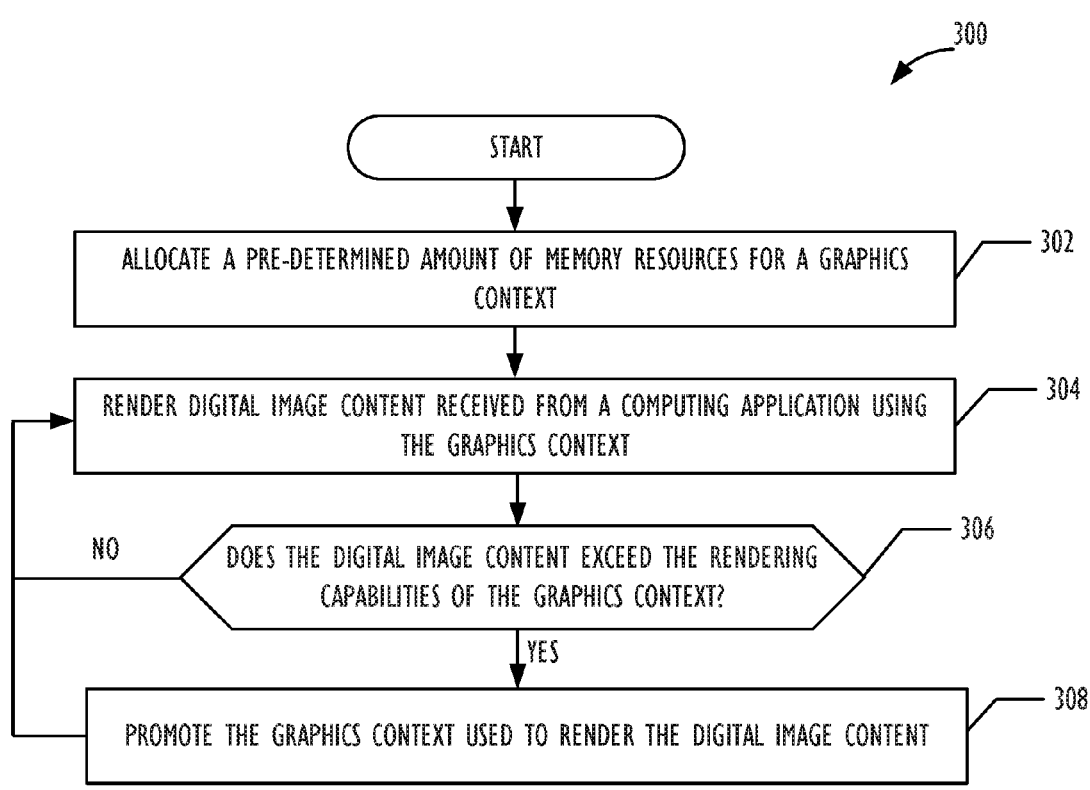
FIG. 3 illustrates a graphics context promotion operation for dynamically selecting image rendering formats without initially documenting image information associated with the digital image content.

FIG. 2 and FIG. 3 illustrate embodiments of graphics context promotion operations that dynamically selects image rendering formats for rendering digital image content. Using FIG. 1 as an example, the graphics context promotion operations 200 and 300 may be implemented by an application services in the application services layer 108 that interface with a computing application in the application layer 110. The graphics context promotion operations 200 and 300 may invoke of a variety of lower-level APIs and frameworks, drivers, and/or graphics hardware resource to render digital image content. In another embodiment, graphics context promotion operations 200 and 300 may be implemented by layer 152 that includes functions across multiple layers of the graphics software architecture 100 shown in FIG. 1. Additionally, the graphics context promotion operations 200 and 300 may be implemented using lower APIs, such as APIs located in O/S service layer 106 shown in FIG. 1. Examples of computing systems that may implement the graphics context promotion operations 200 and 300 include but are not limited to computers, servers, laptops, wearable electronic devices, video game consoles, and/or mobile devices (e.g., smartphones, tablets, and/or other smart devices).

FIG. 2 illustrates a graphics context promotion operation 200 that dynamically selects image rendering formats by documenting image information used to render the digital image content. A computing system may implement the graphics context promotion operation 200 when a computing application operating on the computing system is unaware of the digital image content. The computing applications may use one or more APIs and/or frameworks that causes the computing application to be unaware of the digital image content to render. For example, this may occur in situations where a user's actions may affect the type of digital images to render. Specifically, in a web browser application, a user may access an Internet website that include digital images with varying image content and quality. A computing system may not utilize graphics context promotion operation 200 when the one or more APIs and/or frameworks causes the computing application to identify the image content at time to allocate memory and other graphics hardware resources. When this occurs, helper APIs and/or frameworks may parse the digital image content and select an image rendering format for the known image content.

The graphics context promotion operation 200 can start at block 202 and receive image information for rendering digital image content from a computing application. By way of example, the computing application may issue one or more rendering commands (e.g., draw commands) for one or more objects found within a scene. The rendering commands do not directly cause actual rendering of the digital image content, but instead may provide image information to update a graphics display list, a model, and/or other type of representation that defines the digital image content.

The graphics context promotion operation 200 may then move to block 204 and document the image information without allocating memory resources for the graphics contexts. In one embodiment, the graphics context promotion operation 200 may document rendering commands from the computing application by caching and/or copying the rendering commands into memory. The graphics context promotion operation 200 may store the rendering commands using a graphics display lists, a model, and/or any other type of representation. The graphics display list, model, and/or other types of representations may be configured to store image information (e.g., rendering commands) for two-dimensional and/or three-dimensional digital images.

The graphics context promotion operation 200 may then proceed to block 206 and determine whether a rendering trigger event occurs. The rendering triggering event may correspond to a determination to render the documented digital image content stored in memory (e.g., the graphics display list). Embodiments of graphics context promotion operation 200 may utilize a variety of rendering trigger events that can be based on a programmer's preference, an application service's settings, and/or the available graphics processing resources. Recall that non-limiting examples of rendering trigger event include when: the computing application receives all digital image content to render, the memory size to cache rendering commands reaches a predetermined thresholds (e.g., a maximum number of images and/or memory space), the graphics context promotion operation 200 receives a specific rendering command (e.g., set a color and/or draw a color), the graphics context promotion operation 200 determines that a received rendering operation is larger than a previously stored rendering operation, a developer and/or user attempts to access the memory buffer that stores the graphics context, or combinations thereof. If the graphics context promotion operation 200 determines that a rendering triggering event has not occurred, then the graphics context promotion operation 200 moves back to block 202 and continues to receive and update the documentation of image information without allocating memory resources for graphics contexts.

The graphics context promotion operation 200 may move to block 208 when a triggering event occurs. At block 208, graphics context promotion operation 200 may select one or more image rendering formats for the documented digital image content. For example, the graphics context promotion operation 200 may select one image rendering format that corresponds to one or more graphics context. The graphics context promotion operation 200 may subsequently use the graphics contexts to render the documented digital image content. In another embodiment, graphics context promotion operation 200 may select multiple image rendering formats that correspond to multiple graphics contexts. The graphics context promotion operation 200 may use multiple graphics contexts to render the documented digital image content.

To select an image rendering format, the graphics context promotion operation 200 may analyze the image quality of the documented digital image content. When analyzing the image quality, the graphics context promotion operation 200 may evaluate a variety of rendering parameters associated with the digital images, such as image profiles, dynamic ranges, and rendering colors. Based on the image quality, the graphics context promotion operation 200 may determine an image rendering format appropriate to render the digital image content. For example, if the digital image content includes an HDR image, the graphics context promotion operation 200 may select an image rendering format that supports the HDR image's dynamic range and color gamut size. In other words, the selected image rendering format may include enough range and precision to represent the HDR image's dynamic range and gamut size. In one embodiment, the graphics context promotion operation 200 may a select image rendering format that contains enough bits for each pixel (e.g., 64 bits per pixel) to accommodate higher quality digital image content, such as dynamic range and color gamut size.

In one embodiment, for each graphics context, the graphics context promotion operation 200 may select an image rendering format that supports the highest image quality for the digital image content. For example, the documented image content may include multiple digital images that vary in image quality. One digital image may have a lower image quality that may be encoded using an 8-bit per color channel rendering format (e.g., sRGB image). Another digital image may have a higher quality image that may require an image rendering format that supports 10 bit per color channel images. In this embodiment, at block 208, the graphics context promotion operation 200 may select the image rendering format that supports 10 bit per color channel images. Other embodiments of the graphics context promotion operation 200 may select an image rendering format based on one or more factors that include, but are not limited to as graphics processing speed, power usage, and/or utilization of memory size.

Once the graphics context promotion operation 200 selects the image rendering format, the context promotion operation 200 moves to block 210 and allocates the memory space for the graphics context based on the selected image rendering formats. At block 210, the graphics context promotion operation 200 may start the rendering process by committing memory space for each graphics context and other graphics processing resources. Afterwards, the graphics context promotion operation 200 moves to block 212 and renders the digital image content. In one embodiment, the graphics context promotion operation 200 may render multiple digital images in the digital image content using a single graphics context.

The graphics context promotion operation 200 may then move to block 214 to determine whether additional digital image content received after the trigger event exceeds one or more rendering capabilities of the current graphics context. When graphics context promotion operation 200 receives additional digital image content, the graphics context promotion operation 200 may document the image information in a similar fashion as discussed in block 204. The graphics context promotion operation 200 may check the rendering parameters, such as imaging profiles, dynamic ranges, and rendered colors that are indicative of the additional digital image content's image quality to determine whether it exceeds one or more rendering capabilities of the current graphics context. For example, after the graphics context promotion operation 200 commits memory resources for a graphics context to support 8 bit per color channel images, the graphics context promotion operation 200 may then receive additional digital image content after the triggering event from the computing application that requires at least a 10 bit per color channel image format. Specifically, the additional digital image content may include quality attributes, such as colors and/or a brightness levels, not found in a sRGB image format. At this point, the graphics context promotion operation 200 may determine that the additional digital image content exceeds the rendering capabilities of the current graphics context.

If the additional digital image content does not exceed the rendering capabilities of the current graphics context, then graphics context promotion operation 200 may move back to block 212 and render the additional digital image content. If the additional digital image content exceeds the rendering capabilities of the current graphics context, then graphics context promotion operation 200 may then move to block 216 and promote the graphics context to an image rendering format that supports the additional digital image content. The promoting the graphics context may involve creating a new pointer and allocating enough memory space to support the higher image quality, such as more dynamic range and greater gamut precision. Additionally or alternatively, promoting the graphics context may include selecting either utilization of a GPU, a CPU, or simultaneously using both a GPU and CPU that distributes the load according to a variety operations that include, but are not limited to optimization criteria and/or multiple threads. After promoting the graphics context, the graphics context promotion operation 200 may continue with the rendering process by returning back to block 212.

FIG. 3 illustrates a graphics context promotion operation 300 for dynamically selecting image rendering formats without initially documenting image information associated with the digital image content. In one embodiment, a computing system may utilize the graphics context promotion operation 300 when another application service or other framework initially performs the allocation of graphics hardware resources to render digital image content. In this instance, the other application service or other framework may allocate graphics hardware resources for graphics contexts corresponding to an initial image rendering format. For example, the initial image rendering format may correspond to rendering a relatively low-quality digital image content. To render a received higher quality digital image content, the graphics context promotion operation 300 may subsequently promote the graphics contexts to correspond to an updated image rendering format.

In another embodiment and similar to graphics context promotion operation 200 shown in FIG. 2, a computing system may utilize the graphics context promotion operation 300 when the digital image content for a computing application may be initially known at the time to allocate memory and other graphics hardware resources. Helper APIs and/or frameworks may parse the digital image content and select an initially image rendering format for the known digital image content. In some instances, the computing system may reuse the graphics context to draw additional digital image contents. During the harvesting process, the graphics context promotion operation 300 may subsequently promote the graphics contexts when the additional digital image content includes greater dynamic ranges and/or a wider color gamut than the known digital image content. In this instance, the graphics context promotion operation 300 may determine that the additional range and precision for rendering the additional digital image content exceeds the graphics context's capabilities.

The graphics context promotion operation 300 may start at block 302 and allocate a pre-determined amount of memory resources for a graphics context. Rather than caching and/or copying rendering commands in a graphics lists, model, or other representation, the graphics context promotion operation 300 may start the rendering process. In one embodiment, the pre-determined amount of memory resources could be set to a minimal memory allocation for rendering the digital image content (e.g., to render sRGB images). The graphics context promotion operation 300 may then move to block 304 and render the digital image content received from a computing application using the graphics context. At this point, the range of the digital image content's image quality may be unknown.

The graphics context promotion operation 300 may then move to block 306 and determine whether the digital image content exceeds the rendering capabilities of the graphics context. If the graphics context promotion operation 300 determines that the digital image content does not exceed the capabilities of the graphics context, then graphics context promotion operation 300 returns to block 304. Otherwise, the graphics context promotion operation 300 moves to block 308 and promotes the graphics context used to render the digital image content. Blocks 304 and 308 of the graphics context promotion operation 300 may perform graphic operations that are substantially similar to blocks 214 and 216 of FIG. 2, respectively.

As used herein, the term "graphics context" is a term of art that refers to a drawing destination located in memory. A graphics context includes drawing parameters and other parameters for graphics processing resources to perform drawing commands. Non-limiting examples of drawing parameters include drawing colors, clipping area, line width, style information, compositing options. In one embodiment, the graphics context may be a bitmap context for digital image content.

As used herein, the term "digital image content" refers to one or more graphics outputs capable of being displayed on one or more electronic display devices. Non-limiting examples of digital image content include one or more digital pictures, computing windows, text only windows, visual areas associated with one or more graphical user interface (GUI), digital video, objects within a scene, and/or other visual graphics viewable by a user of an electronic computing devices after completing the rendering process.

As used herein, the term "image rendering format" encodes one or more image quality attributes, such as dynamic range and gamut size, for rendering digital image content. Image rendering formats are not limited to a specific color model, such as the RGB color model, and may also reference one or more graphics processing resources used to render images (e.g., CPU, GPU, and memory size). Non-limiting examples of image rendering formats include an 8 bit per color channel image format (e.g., sRGB bitmap), a 10 bit per color channel image format (e.g., 10 bit RGB bitmap), a 16 bit per color channel image format and a 32 bit per color channel image format. Image rendering formats are not limited to a specific file formats, such as bitmap, tagged image file format (TIFF), and portable document format (PDF) and instead may encoded in any file format known by persons of ordinary skill in the art.

As used herein, the term "computing system" refers to a single electronic device or to two or more electronic devices working together to perform the function described as being performed on or by the computing system.

Figure 4:
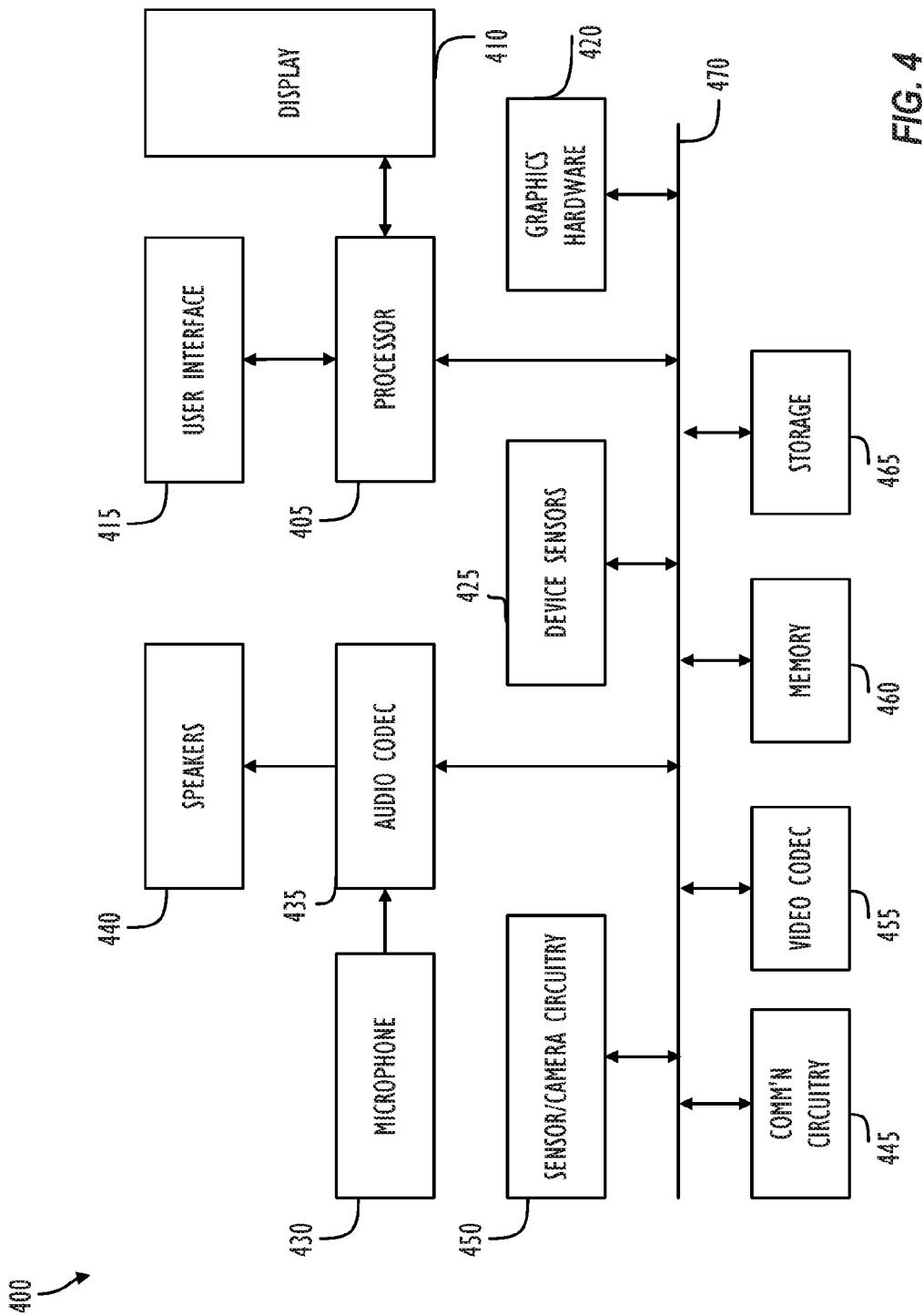
FIG. 4 shows a simplified functional block diagram of an electronic device in accordance with one embodiment.

Referring to FIG. 4, a simplified functional block diagram of illustrative electronic device 400 that promotes graphics contexts and perform graphics context promotion operations as described in FIGS. 2 and 3. Electronic device 400 may include processor 405, display 410, user interface 415, graphics hardware 420, device sensors 425 (e.g., proximity sensor/ambient light sensor, accelerometer and/or gyroscope), microphone 430, audio codec(s) 435, speaker(s) 440, communications circuitry 445, digital image capture unit 450, video codec(s) 455, memory 460, storage 465, and communications bus 470. Electronic device 400 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 400.

Processor 405 may execute instructions necessary to carry out or control the operation of many functions performed by device 400. Processor 405 may, for instance, drive display 410 and receive user input from user interface 415. User interface 415 can take a variety of forms, such as a button, keypad, dial, a click wheel, keyboard, display screen, a touch screen, or combinations thereof. Processor 405 may also, for example, be a system-on-chip such as those found in mobile devices and include a dedicated GPU. Processor 405 may be based on reduced instruction-set computer (RISC) or complex instruction-set computer (CISC) architectures or any other suitable architecture and may include one or more processing cores. Graphics hardware 420 may be special purpose computational hardware for processing graphics and/or assisting processor 405 to process graphics information. In one embodiment, graphics hardware 420 may include a programmable GPU.

Sensor and camera circuitry 450 may capture still and video images that may be processed, at least in part, in accordance with the disclosed techniques by video codec(s) 455 and/or processor 405 and/or graphics hardware 420, and/or a dedicated image processing unit incorporated within circuitry 450. Images so captured may be stored in memory 460 and/or storage 465. Memory 460 may include one or more different types of media used by processor 405 and graphics hardware 420 to perform device functions. For example, memory 460 may include memory cache, read-only memory (ROM), and/or random access memory (RAM). Storage 465 may store media (e.g., audio, image and video files), computer program instructions or software, preference information, device profile information, and any other suitable data. Storage 465 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 460 and storage 465 may be used to tangibly retain computer program instructions or code organized into one or more modules and written in any desired computer programming language. When executed by, for example, processor 405 such computer program code may implement one or more of the operations described herein.

It is to be understood that the above description is intended to be illustrative, and not restrictive. The material has been presented to enable any person skilled in the art to make and use the claimed subject matter as described herein, and is provided in the context of particular embodiments, variations of which will be readily apparent to those skilled in the art (e.g., some of the disclosed embodiments may be used in combination with each other). In addition, some of the described operations may have their individual steps performed in an order different from, or in conjunction with other steps, that presented herein. More generally, if there is hardware support some operations described in conjunction with FIGS. 2 and 3 may be performed in parallel.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by a programmable control device and comprising instructions stored thereon to cause one or more programmable control devices to:
    render digital image content based on a graphics context having an associated initial image rendering format and initial allocation of graphics processing resources, wherein the graphics context is indicative of a rendering destination within a memory for performing received rendering commands;
    receive a rendering command via an application program interface (API) to render additional digital image content;
    determine, in response to receiving the rendering command and prior to rendering the additional digital image content, whether a quality of the additional digital image content exceeds a capability of the initial allocation of graphics processing resources associated with the graphics context;
    select an updated image rendering format that supports the additional digital image content based on the determination that the quality of the additional digital image content exceeds the capability of the initial allocation of graphics processing resources;
    reallocate the graphics processing resources associated with the graphics context based on the updated image rendering format to form a promoted graphics context; and
    initiate performance of the rendering command with the promoted graphics context to render the additional digital image content.

2. The non-transitory program storage device of claim 1, wherein the instructions further cause the one or more programmable control devices to document the rendering command within a graphics display list prior to rendering the additional digital image content.

3. The non-transitory program storage device of claim 2, wherein the instructions further cause the one or more programmable control devices to:
    determine whether a rendering trigger event occurs when documenting the rendering command; and
    perform the rendering command with the promoted graphics context after the determination that the rendering trigger event occurs.

4. The non-transitory program storage device of claim 2, wherein the graphics display list includes a plurality of other rendering commands for a plurality of other digital image content.

5. The non-transitory program storage device of claim 1, wherein the instructions to cause the one or more programmable control devices to reallocate the graphics processing resources comprise instructions to cause the one or more programmable control devices to expand an allocation of memory space to store the promoted graphics context when performing the rendering command.

6. The non-transitory program storage device of claim 1, wherein the quality of the additional digital image content is based on a dynamic range of the additional digital image content, a color gamut size of the additional digital image content, or a combination thereof.

7. The non-transitory program storage device of claim 1, wherein the instructions to cause the one or more programmable control devices to determine whether a quality of the additional digital image content exceeds the capability of the initial allocation of graphics processing resources comprise instructions to cause the one or more programmable control devices to:
    check dynamic range and gamut parameters associated with the additional digital image content; and
    determine whether a dynamic range and a gamut precision of the graphics context support the dynamic range and gamut parameters.

8. The non-transitory program storage device of claim 1, wherein a number of bits per pixel for the initial image rendering format is less than a number of bits per pixel for the updated image rendering format.

9. A system comprising:
    memory; and
    one or more programmable control devices operable to interact with an image capture device and the memory, and to perform operations comprising:
        render digital image content based on a graphics context having an associated initial image rendering format and initial allocation of graphics processing resources, wherein the graphics context is indicative of a rendering destination within memory for performing received rendering commands;
        receive a rendering command via an application program interface (API) to render additional digital image content;
        determine, in response to receiving the rendering command and prior to rendering the additional digital image content, whether a quality of the additional digital image content exceeds a capability of the initial allocation of graphics processing resources associated with the graphics context;

select an updated image rendering format that supports the additional digital image content based on the determination that the quality of the additional digital image content exceeds the capability of the initial allocation of graphics processing resources;

reallocate the graphics processing resources associated with the graphics context based on the updated image rendering format to form a promoted graphics context; and initiate performance of the rendering command with the promoted graphics context to render the additional digital image content.

10. The system of claim 9, wherein the one or more programmable control devices further perform operations comprising document the rendering command within a graphics display list prior to rendering the additional digital image content.

11. The system of claim 10, wherein the one or more programmable control devices further perform operations comprising:

determine whether a rendering trigger event occurs when documenting the rendering command; and perform the rendering command with the promoted graphics context after the determination that the rendering trigger event occurs.

12. The system of claim 9, wherein reallocating the graphics processing resources comprises expanding an allocation of memory space to store the promoted graphics context when performing the rendering command.

13. The system of claim 9, wherein determining a quality of the additional digital image content exceeds the capability of the initial allocation of graphics processing resources comprises:

checking dynamic range and gamut parameters associated with the additional digital image content; and determining whether a dynamic range and a gamut precision of the graphics context supports the dynamic range and gamut parameters.

14. The system of claim 9, wherein a number of bits per pixel for the initial image rendering format is less than a number of bits per pixel for the updated image rendering format.

15. The system of claim 9, wherein the quality of the additional digital image content is based on a dynamic range of the additional digital image content, a color gamut size of the additional digital image content, or a combination thereof.

16. A computer-implemented method comprising:

rendering digital image content based on a graphics context having an associated initial image rendering format and initial allocation of graphics processing resources, wherein the graphics context is indicative of a rendering destination within memory for performing received drawing commands;

receiving a drawing command via an application program interface (API) to render additional digital image content;

determining, in response to receiving the drawing command and prior to rendering the additional digital image content, whether a quality of the additional digital image content exceeds a capability of the initial allocation of graphics processing resources associated with the graphics context;

selecting an updated image rendering format that supports the additional digital image content based on the quality of the digital image;

reallocating the graphics processing resources associated with the graphics context based on the updated image rendering format to form a promoted graphics context; and performing the draw command with the promoted graphics context to render the additional digital image content.

17. The method of claim 16, further comprising documenting the draw command within a graphics display list prior to rendering the additional digital image content.

18. The method of claim 17, further comprising:

determining whether a rendering trigger event occurs when documenting the drawing command; and performing the drawing command with the promoted graphics context based on the determination that the rendering trigger event occurs.

19. The method of claim 16, wherein reallocating the graphics processing resources comprises expanding an allocation of memory space to store the promoted graphics context when performing the drawing command.

20. The method of claim 19, wherein the quality of the additional digital image content is based on a dynamic range of the additional digital image content, a color gamut size of the additional digital image content, or a combination thereof.

* * * * *